United States Patent [19]

Van Assche

[11] 4,330,596
[45] May 18, 1982

[54] BODIES COMPOSED OF AT LEAST TWO PARTS, SEALING GLASS AND METHOD FOR BONDING PARTS

[75] Inventor: Paul J. Van Assche, Eindhoven, Netherlands

[73] Assignee: U.S. Philips Corporation, New York, N.Y.

[21] Appl. No.: 209,794

[22] Filed: Nov. 24, 1980

[30] Foreign Application Priority Data

Nov. 22, 1979 [NL] Netherlands .......................... 7908501

[51] Int. Cl.³ .......................... B32B 17/06; C03C 3/14
[52] U.S. Cl. ..................................... 428/428; 501/49; 501/52; 501/79; 428/432
[58] Field of Search ............................ 501/49, 52, 79; 428/428, 432

[56] References Cited

U.S. PATENT DOCUMENTS 3,446,695  5/1969  Janakirama-Rao et al. .......... 501/49
3,970,464  7/1976  Shill ..................................... 501/49

*Primary Examiner*—Mark Bell
*Attorney, Agent, or Firm*—Paul R. Miller

[57] ABSTRACT

In practice no sealing glasses are known with which glass or ceramic material having a coefficient of thermal expansion $\alpha_{30°\text{-}300°}$ C. in the range between 31 to $36 \times 10^{-7}$ per °C. can be sealed together.

The invention provides bodies which are composed of at least two parts, these parts having been made from a material having a coefficient of expansion as mentioned above, the parts having been sealed together by means of a sealing glass containing 8–10 weight % vanadium pentoxide, 1.5–3.0 weight % copper (II) oxide, 1–3 weight % lead (II) oxide, 0–1 weight % silicon oxide, 0–5 weight % aluminium oxide, 26–28 weight % boron oxide and 58–61 weight % zinc oxide. The weight ratio of boron oxide to zinc oxide is in the range from 0.45 to 0.47.

The body is composed of parts (1 and 3), which have been sealed together by means of the sealing glass (2).

4 Claims, 1 Drawing Figure

U.S. Patent  May 18, 1982  4,330,596
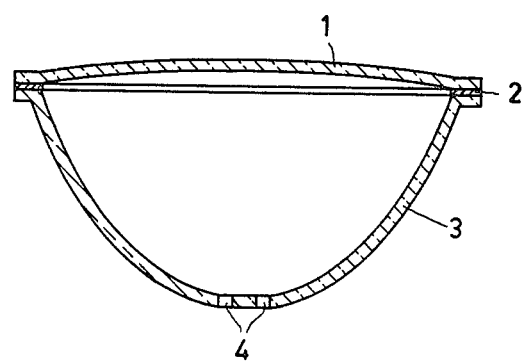

BODIES COMPOSED OF AT LEAST TWO PARTS, SEALING GLASS AND METHOD FOR BONDING PARTS

The invention relates to a body composed of at least two parts made of a glass or a ceramic material having a coefficient of thermal expansion $\alpha_{30°-300°\,C.}$ in the range 31 to $36 \times 10^{-7}$ per °C., these parts having been sealed together by means of a sealing glass containing vanadium pentoxide, copper oxide, lead oxide boron oxide and zinc oxide.

The invention further relates to a sealing glass containing vanadium pentoxide, copper oxide, lead oxide, boron oxide, zinc oxide and silicon oxide and to a method of sealing together at least two parts consisting of glass or of a ceramic material having a coefficient of thermal expansion $\alpha_{30°-300+\,C.}$ in the range 31 to $36 \times 10^{-7}$ per °C., a sealing glass according to the invention being applied between the parts.

The invention provides composite bodies with vacuum-tight seals and which consist of at least two parts. An example of such bodies are lamps made of so-called Pyrex glass (approximately 80–81 weight % $SiO_2$, 11–12 weight % $B_2O_3$, 2–3 weight % $Al_2O_3$, 4–5 weight % $Na_2O$ and optionally further constituents). Pyrex glass has a coefficient of expansion $\alpha_{30°-300°\,C.}$ of $32-35 \times 10^{-7}$ per °C. These lamps are composed of several parts, for example a screen and a cone, which are fused together.

U.S. Pat. No. 3,446,695 discloses sealing glass containing vanadium pentoxide, boron oxide, zinc oxide, copper oxide (CuO), lead oxide (PbO) and silicon oxide. These known solder glasses have a coefficient of thermal expansion of $44-50 \times 10^{-7}$ per °C. ($\alpha_{0°-300°\,C.}$).

The coefficient of expansion of the known sealing glass is still to high to allow proper bonding of glass and ceramic materials which themselves have a coefficient of thermal expansion of $31-36 \times 10^{-7}$ per °C. For such materials one must have a sealing glass having a coefficient of expansion of not more than $40 \times 10^{-7}$ per °C., preferably still closer to $31-36 \times 10^{-7}$ per °C. at one's disposal.

The invention provides a composite body and a sealing glass suitable for the production thereof, the sealing glass having a coefficient of expansion of less than $40 \times 10^{-7}$ per °C., and in accordance with a preferred embodiment having a coefficient of expansion of approximately $38 \times 10^{-7}$ per °C.

The invention is based on the surprising recognition of the fact that within an extremely limited composition range within the range known from U.S. Pat. No. 3,446,695, sealing glasses can be obtained which have the desired low coefficient of expansion. This is particularly surprising in view of an article by E. P. Denton et al, In J. Soc. of Glass Technology, 1956, page 252T, where it is stated that it is possible to obtain in the system $ZnO-B_2O_3-V_2O_5$ a sealing glass having a coefficient of expansion of approximately $48 \times 10^{-7}$ per °C., but that it is very difficult to obtain such a glass having a coefficient of expansion of approximately $37 \times 10^{-7}$ per °C. The said article only mentions glasses having a coefficient of expansion of approximately $48 \times 10^{-7}$ per °C.

The body according to the invention is characterized in that the sealing glass contains 8–10 weight % vanadium pentoxide, 1.5–3.0 weight % copper (II) oxide, 1–3 weight % lead (II) oxide, 0–1 weight % silicon (IV) oxide, 0.5 weight % aluminium oxide, 26–28 weight % boron (III) oxide and 58–61 weight % zinc oxide, the weight ratio between the boron oxide and the zinc oxide being from 0.45 to 0.47. The composition is calculated with respect to the weights of raw materials used to make the sealing glass.

The sealing glass according to the invention is characterized by the above-mentioned composition. According to the invention, the sealing glass is preferably composed of 9.0 weight % vanadium pentoxide, 27.2 weight % boron oxide, 59.3 weight % weight zinc oxide, 2.3 weight % copper (II)-oxide, 1.8 weight % lead (II) oxide and 0.4 weight % $SiO_2$. In the method according to the invention, a sealing glass according to the invention (which usually has been previously worked into a paste) is applied between the parts to be sealed and the assembly is heated to 590°–610° C. for ½–2 hours. The best results were obtained by heating for one hour at 600° C.

The bodies according to the invention have vacuum-tight seals and are particularly suitable for use as lamp envelopes made of Pyrex glass.

The sealing glass according to the invention has an advantageous coefficient of expansion (less than $40 \times 10^{-7}$ per °C.). In addition, the sealing glass is stable and wets the surfaces which are to be sealed together very well. A further important property of the sealing glass according to the invention is that it allows working at temperatures of not more than 590°–610° C. Temperatures above 610° C. must not be used when sealing parts of the above-mentioned Pyrex glass together. Above 610° C. the Pyrex glass softens to such an extent that it looses its shape.

The invention will now be further explained by way of non-limitative example with reference to the accompanying FIGURE.

The FIGURE shows a cross-sectional view of a body, more specifically a lamp envelope made of Pyrex glass according to the invention.

A body according to the invention is shown in the FIGURE. The FIGURE shows the bulb of a Pyrex glass lamp. Reference numeral 1 denotes the screen and reference numeral 3 denotes the cone. Reference numeral 4 denotes feed-through apertures for the current leads. The parts 1 and 3 are sealed together by means of a sealing glass 2. The sealing glass 2 contains 8–10 weight % vanadium pentoxide, 1.5.–3.0 weight % copper (II) oxide, 1–3 weight % lead (II)-oxide, 0–1 weight % silicon oxide, 0–5 weight % aluminium oxide, 26–28 weight % boron oxide and 58–61 weight % zinc oxide. The weight ratio between the boron oxide and the zinc oxide is comprised between 0.45 and 0.47, including the limit values. When using this sealing glass, a good vacuum-tight bond can be obtained between the parts 1 and 3. In combination with Pyrex glass parts a sealing glass is preferably used which contains 9.0 weight % vanadium pentoxide, 27,2 weight % boron oxide, 59.3 weight % zinc oxide, 2.3 weight % copper oxide, 1.8 weight % lead oxide and 0.4% weight % silicon oxide.

The sealing glass according to the invention contains the above-mentioned constituents in the above-defined quantities. The sealing glass according to the invention can be prepared and worked up to a suitable paste as follows: Suitable raw materials such as the above-mentioned oxides or carborates or hydroxides which are converted into said oxides upon heating are mixed in the required quantities and melted at 1200° C. in a platinum crucible for, for example, 1 hour. The melt is thereafter poured onto a cold plate, as a result of which the glass breaks into fragments. The glass fragments are thereafter ground and passed through sieves until particles of a size of, for example, less than 125 micrometers are obtained. A sealing paste can then be made in a known manner from the glass powder obtained, with the aid of nitro-cellulose and amyl acetate.

In the method according to the invention of sealing together at least two parts consisting of a glass or a ceramic material having a coefficient of thermal expansion $\alpha_{30°\text{-}300°\ C.}$ of between 31 and $36 \times 10^{-7}$ per °C., a sealing glass according to the invention, preferably in the form of the above-mentioned paste, is applied between the parts and the assembly is heated at 590°–610° C. for ½ to 2 hours. Preferably, the paste is first dried after application to allow the amyl acetate to evaporate (for example ½ hour at 360° C.). When sealing Pyrex glass parts together, heating must not be effected above 610° C. as at such a temperature the Pyrex parts are deformed. Temperatures less than 590° C. must not be used, as, when temperatures lower than 590° C. are used, a higher coefficient of expansion is obtained for the sealing glass which is too high for Pyrex glass.

In accordance with the above-described method, two sealing glass were prepared and made into a powder having a particle size of less than 125 micrometer. The first sealing glass was composed of 9.0 weight % vanadium pentoxide, 27.2 weight % boron oxide ($B_2O_3$), 59.3 weight % zinc oxide, 2.3 weight % copper (II) oxide, 1.8 weight % lead (II) oxide and 0.4 weight % silicon oxide ($SiO_2$) (sealing glass A). The second glass consisted of 9.5 weight % vanadium pentoxide, 28.6 weight % boron oxide ($B_2O_3$), 57.1 weight % zinc oxide, 2.4 weight % copper (II) oxide, 1.9 weight % lead (II) oxide and 0.5 weight % silicon oxide ($SiO_2$) (sealing glass B). Sealing glass B corresponds with composition number 24 in Table 2 of the U.S. Pat. No. 3,446,695. The weight ratio boron oxide -zinc oxide is 0.46 for sealing glass A and 0.50 for sealing glass B. The powder obtained from the sealing glasses A and B were made into rods having a length of 50 mm and a cross-section of $10 \times 10$ mm. To this end the glass powder was disposed in a mould, pressed manually and heated at 600° C. for one hour. Rods having a cross-section of $3 \times 2$ mm were cut from the rods obtained in accordance with this procedure. The linear extension of these rods was determined between 30° and 300° C. Sealing glass A according to the invention has a coefficient of expansion $\alpha_{30°\text{-}300°\ C.}$ of $38.5 \times 10^{-7}$ per °C. and sealing glass B had a coefficient of expansion of $45 \times 10^{-7}$ per °C.

Because of this coefficient of expansion, sealing glass A according to the invention is suitable for sealing together Pyrex glass parts and other materials having a coefficient of expansion ranging from $31\text{-}36 \times 10^{-7}$ per °C., while the known sealing glass B is not suitable in view of its coefficient of expansion which is too high.

What is claimed is:

1. Bodies composed of at least two parts produced of a glass or a ceramic material having a coefficient of thermal expansion $\alpha_{30°\text{-}300°\ C.}$ in the range 31 to $36 \times 10^{-7}$ per °C., these parts having been sealed together by means of a sealing glass having a coefficient of expansion of less than $40 \times 10^{-7}$ per °C. characterized in that the sealing glass consists essentially of 8–10 weight % vanadium pentoxide, 1.5–3.0 weight % copper (II) oxide, 1–3 weight % lead (II) oxide, 0–1 weight % silicon (IV) oxide, 0–5 weight % aluminium oxide, 26–28 weight % boron (III) oxide and 58–61 weight % zinc oxide, the weight ratio boron oxide to zinc oxide being from 0.45 to 0.47.

2. A body is claimed in claim 1, characterized in that the sealing glass contains 9.0 weight % vanadium-pentoxide, 27.2 weight % boron oxide, 59.3 weight % zinc oxide, 2.3 weight % copper oxide, 1.8 weight % lead oxide and 0.4 weight % silicon oxide.

3. A sealing glass having a coefficient of expansion of less than $40 \times 10^{-7}$ per °C. characterized in that the sealing glass consists essentially of 8–10 weight % vanadium pentoxide, 1.5–3.0 weight % copper (II) oxide, 1–3 weight % lead (II) oxide, 0–1 weight % silicon oxide, 0–5 weight % aluminium oxide, 26–28 weight % boron oxide, and 58–61 weight % zinc oxide, the weight ratio boron oxide to zinc oxide being from 0.45 to 0.47.

4. A sealing glass as claimed in claim 3, characterized in that the sealing glass contains 9.0 weight % vanadium pentoxide, 27.2 weight % boron oxide, 59.3 weight % zinc oxide, 2.3 weight % copper oxide, 1.8 weight % lead oxide and 0.4 weight % silicon oxide.

* * * * *